United States Patent
Bakker et al.

(10) Patent No.: US 8,494,505 B2
(45) Date of Patent: Jul. 23, 2013

(54) SYSTEM AND METHOD FOR COMMUNICATION DIVERSION NOTIFICATION

(75) Inventors: John-Luc Bakker, Keller, TX (US); Adrian Buckley, Tracy, CA (US)

(73) Assignee: Research In Motion Limited, Waterloo, Ontario (CA)

( * ) Notice: Subject to any disclaimer, the term of this patent is extended or adjusted under 35 U.S.C. 154(b) by 1202 days.

(21) Appl. No.: 12/256,136

(22) Filed: Oct. 22, 2008

(65) Prior Publication Data
US 2009/0104899 A1    Apr. 23, 2009

Related U.S. Application Data

(60) Provisional application No. 60/982,058, filed on Oct. 23, 2007.

(51) Int. Cl.
*H04M 3/42*       (2006.01)
(52) U.S. Cl.
USPC .......... 455/417; 455/458; 379/76; 379/88.11; 379/88.12; 379/207.08
(58) Field of Classification Search
USPC .............. 455/417, 458; 379/76, 88.11, 88.12, 379/207.08
See application file for complete search history.

(56) References Cited

U.S. PATENT DOCUMENTS

| | | | | |
|---|---|---|---|---|
| 5,832,060 A * | 11/1998 | Corlett et al. | ............... | 379/88.19 |
| 6,070,080 A * | 5/2000 | Madour et al. | ................ | 455/458 |
| 7,035,390 B2 * | 4/2006 | Elliott | ..................... | 379/201.02 |
| 7,039,164 B1 * | 5/2006 | Howe | .......................... | 379/88.05 |
| 2004/0139471 A1 * | 7/2004 | Geen et al. | ..................... | 725/106 |
| 2004/0184419 A1 * | 9/2004 | Park | ............................... | 370/328 |
| 2009/0024760 A1 * | 1/2009 | Saha et al. | ..................... | 709/242 |
| 2009/0043704 A1 * | 2/2009 | Bantukul et al. | ................ | 705/42 |

FOREIGN PATENT DOCUMENTS

| | | |
|---|---|---|
| JP | 2065451 A | 3/1990 |
| JP | 5236013 A | 9/1993 |
| JP | 200125016 A | 4/2000 |
| JP | 2000115379 A | 4/2000 |
| WO | 9823111 A2 | 5/1998 |
| WO | 2007037677 A1 | 4/2007 |
| WO | 2007106648 A2 | 9/2007 |

OTHER PUBLICATIONS

3GPP TS 23.122 V7.7.0; 3rd Generation Partnership Project; Technical Specification Group Core Network and Terminals; Non-Access-Stratum (NAS) functions related to Mobile Station (MS) in idle mode; Release 7, Dec. 2006; 34 pgs.
Australian Office Action; Application No. 2008316901; Jul. 1, 2011; 1 page.
European Examination Report; Application No. 08842660.6; Feb. 3, 2011; 4 pgs.

(Continued)

*Primary Examiner* — Nimesh Patel
(74) *Attorney, Agent, or Firm* — Conley Rose, P.C.; J. Robert Brown, Jr.

(57) ABSTRACT

A node and method for communication diversion and communication diversion notification is provided. The node has a component configured to receive notification about a communication diversion related to an incoming communication corresponding to only those communication diversions which match criteria for at least one specific reason to be notified, wherein the notification includes a diversion reason element that is locale-independent encoded.

29 Claims, 7 Drawing Sheets

OTHER PUBLICATIONS

Draft ETSI TS 183 004 V2.1.1; Telecommunications and Internet converged Services and Protocols for Advanced Networking (TISPAN); PSTN/ISDN simulation services; Communication Diversion (CDIV); Protocol specification, Release 2; Sep. 2007; 67 pages.
PCT International Search Report; PCT Application No. PCT/US2008/080752; Mar. 19, 2009; 4 pages.
PCT Written Opinion of the International Searching Authority; PCT Application No. PCT/US2008/080752; Mar. 19, 2009; 7 pages.
Canadian Office Action; Application No. 2,703,960; May 10, 2012; 2 pages.
Japanese Office Action; Application No. 2010-0531200; Jun. 11, 2012; 7 pages.
Japanese Office Action; Application No. 2010-531200; Feb. 7, 2012; 5 pages.
Korean Office Action; Application No. 10-2010-7011064; Feb. 8, 2012; 9 pages.
European Examination Report; Application No. 08842660.6; Apr. 11, 2012; 4 pages.
ETSI TS 183 004 V1.1.1; Telecommunications and Internet Converged Services and Protocols for Advanced Networking (TISPAN); PSTN/ISDN Simulation Services; Communication Diversion (CDIV); Protocol Specification; Apr. 2006; 46 pages.
Chinese Office Action; Application No. 200880112646.1; May 17, 2012; 17 pages.
Chinese Office Action; Application No. 200880112646.1; Feb. 17, 2013; 9 pages.
European Examination Report; Application No. 08842660.6; Apr. 25, 2013; 12 pages.

* cited by examiner

SYSTEM AND METHOD FOR COMMUNICATION DIVERSION NOTIFICATION

CROSS-REFERENCE TO RELATED APPLICATIONS

The present application claims priority to U.S. Provisional Patent Application No. 60/982,058, filed Oct. 23, 2007, by John-Luc Bakker, et al, entitled "System and Method for Handling Private Number Plans", which is incorporated by reference herein as if reproduced in its entirety.

BACKGROUND

Easily transportable devices with wireless telecommunications capabilities, such as mobile telephones, personal digital assistants, handheld computers, and similar devices, will be referred to herein as nodes. The term "node" may refer to a wireless device and its associated Universal Integrated Circuit Card (UICC) that includes a Subscriber Identity Module (SIM) application, a Universal Subscriber Identity Module (USIM) application, or a Removable User Identity Module (R-UIM) application or may refer to the device itself without such a card. The term "node" may also refer to devices that have similar capabilities but that are not transportable, such as a fixed line telephone, a desktop computer, or a set-top box. The term "node" may further refer to a user agent, such as a SIP user agent. A node might communicate with a second node, some other element in a telecommunications network, an automated computing device such as a server computer, or some other device, any of which can be referred to as a correspondent node. A communications connection between a node and a correspondent node might promote a voice call, a file transfer, or some other type of data exchange, any of which can be referred to as a call or a session.

Some nodes communicate in a circuit switched mode, wherein a dedicated communication path exists between two devices. For the duration of a call or session, all data exchanged between the two devices travels along the single path. Some nodes have the capability to communicate in a packet switched mode, wherein a data stream representing a portion of a call or session is divided into packets that are given unique identifiers. The packets might then be transmitted from a source to a destination along different paths and might arrive at the destination at different times. Upon reaching the destination, the packets are reassembled into their original sequence based on the identifiers. Some nodes, known as multi-mode devices, can support both the circuit switched mode and the packet switched mode.

Communications that take place via circuit switching can be said to occur in the circuit switched domain and communications that take place via packet switching can be said to occur in the packet switched domain. Within each domain, several different types of networks, protocols, or technologies can be used. In some cases, the same network, protocol, or technology can be used in both domains. The wireless communication networks may be based on Code Division Multiple Access (CDMA), Time Division Multiple Access (TDMA), Frequency Division Multiple Access (FDMA), Orthogonal Frequency Division Multiplexing (OFDM), or some other multiple access scheme. A CDMA-based network may implement one or more standards such as 3GPP2 IS-2000 (commonly referred to as CDMA 1x), 3GPP2 IS-856 (commonly referred to as CDMA 1xEV-DO), or 3GPP UMTS (Universal Mobile Telecommunications System). A TDMA-based network may implement one or more standards such as 3GPP Global System for Mobile Communications (GSM) or 3GPP General Packet Radio Service (GPRS). A communication network may also consist of fixed line technology.

GSM is an example of a wireless network standard that uses only the circuit switching mode. Examples of wireless network standards that use only packet switching include GPRS, CDMA 1x EV-DO, Worldwide Interoperability for Microwave Access (WiMAX), and Wireless Local Area Network (WLAN), which might comply with Institute of Electrical and Electronics Engineers (IEEE) standards such as 802.16, 802.16e, 802.11a, 802.11b, 802.11g, 802.11n, and similar standards. Examples of wireless network standards that may use both circuit switching and packet switching modes include CDMA 1x and UMTS. An example of an application-layer protocol that can be used in a packet switching wireless network is the Session Initiation Protocol (SIP). SIP has been standardized and governed primarily by the Internet Engineering Task Force (IETF). The IP (Internet Protocol) Multimedia Subsystem (IMS) is a packet switched technology that allows multimedia content to be transmitted between nodes.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. As used throughout this disclosure, criteria can comprise only a single criterion.

In an embodiment, a node is provided that includes a component configured to receive notification about a communication diversion related to an incoming communication corresponding to only those communication diversions which match criteria for at least one specific reason to be notified, wherein the notification includes a diversion reason element that is locale-independent encoded.

In another embodiment, a node is provided that includes a component to provide a subscription message configuring a filter criteria for selecting specific communication diversions and selecting the information about the communication diversion, enabling selecting of only those communication diversions which match the specified reasons be notified, where a cause param parameter maps to a diversion reason element.

In another embodiment, a method is provided for communication diversion and communication diversion notification. The method includes providing a subscription message configuring a first filter criteria for selecting specific communication diversions according to at least one specific reason to be notified. The method further includes enabling selecting of only those communication diversions which match the at least one specific reason be notified, where a redirection reason maps to a diversion reason element.

In another embodiment, a method is provided for communication diversion and communication diversion notification. The method includes receiving a subscription request including a first filter criteria for at least one specific reason to be notified; matching a redirection reason of a communication diversion to the first filter criteria; providing a notification of the communication diversion; and responsive to the communication diversion, communicating information related to the communication diversion, the information including a diversion reason element that is set according to diversion conditions.

In another embodiment, a method is provided for communication diversion notification. The method includes receiving a subscription message from a user equipment configuring filter criteria for selecting specific communication diversions, selecting information about the communication diversion, and enabling selecting only those communication diversions which match the specified reasons be notified, where a cause param parameter maps to a diversion reason element.

In another embodiment, a method is provided for communication diversion. The method includes responsive to receiving a subscription message that includes a time element without a related time zone, rejecting the subscription message with an error message.

Communication Diversion (CDIV) is a configurable service available for circuit switched calls and packet switched calls such as SIP-initiated calls. CDIV can provide features such as call forwarding, call forwarding on busy, and similar options that allow a call to be redirected to a node different from the node to which the call was originally directed. Any such forwarding or retargeting of a call will be referred to herein as diversion of the call. CDIVN is an enhanced version of CDIV that provides a capability for a notification related to a call diversion to be transmitted to a handset or other node from which a call is diverted or retargeted. The notifications may include that the information related to the reason for the call diversion can be transmitted. However, as currently proposed, it is not clear how the call diversion reasons are generated, recognized, stored, presented or otherwise managed.

For example, one proposed diversion reason is 'In Meeting', and this reason might be specified by the following code:

<diversion-reason>In Meeting</diversion-reason>.

However, no mechanism is proposed for a handset user to enter data that could generate this code. Even if a user could manually enter the text 'in meeting' or a similar message into the handset, such user-generated messages cannot be recognized or manipulated by the application server or other network component that might handle the notifications. Specifically, the mapping from the cause param parameter values or other call diversion indicators to a diversion reason element such as "In meeting" is unclear. Therefore, it is unclear how this notification feature can be implemented as it is currently proposed.

In an embodiment, when a call is diverted, a code that corresponds to the reason for the diversion can be transmitted to the node from which the call was diverted. The diversion reason code, which can also be referred to as a diversion reason element, can be obtained from existing call diversion codes that are generated by or available to an application server or similar network component that handles or is aware of the diversion. When one of these call diversion reason codes is transmitted to a node, the node can convert the code into a call diversion reason indicator that is perceptible by the node user. The conversion might be made according to locale settings stored on the node.

Figure 1:
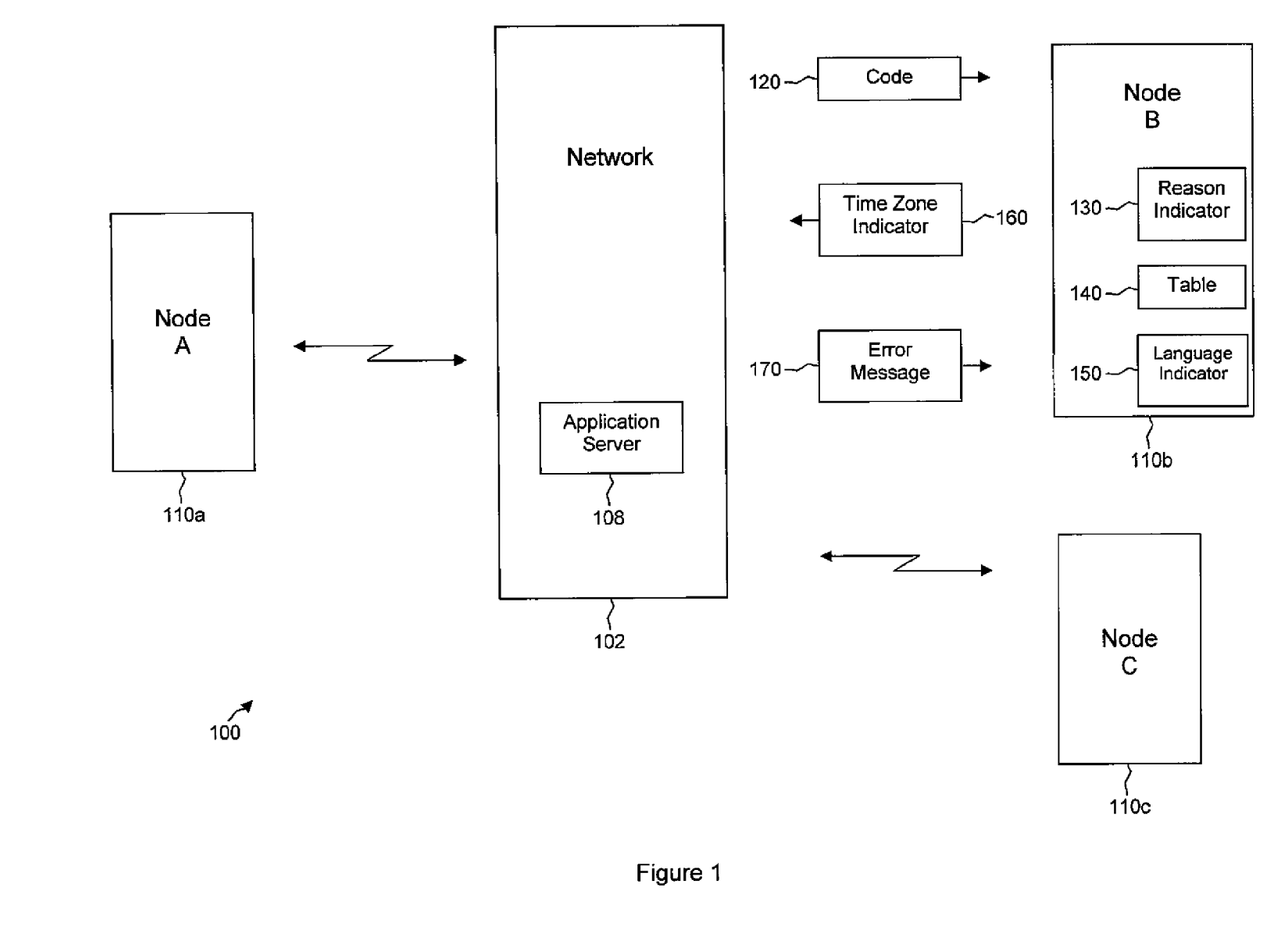
FIG. 1 is a block diagram of a telecommunications system according to an embodiment of the disclosure.

FIG. 1 is a block diagram of an embodiment of a system 100 that can illustrate the use of diversion reason notification when a call is diverted. The system 100 includes a packet switched network 102 that includes an application server 108 that handles call diversion and call diversion notification. In other embodiments, another component or group of components could perform either or both of these functions. Node A 110a places a call to node B 110b via the network 102. Node B 110b has a call forwarding feature activated such that the application server 108 is instructed to forward to node C 110c any calls that are directed to node B 110b. The nodes 110 might be mobile devices or devices with fixed locations.

Figure 2:
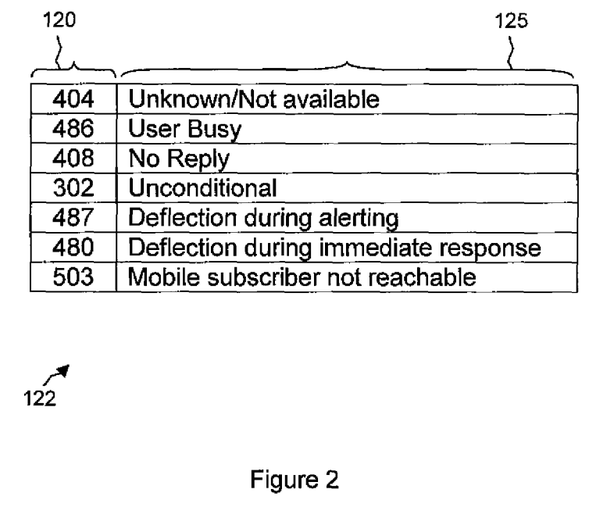
FIG. 2 is a table displaying codes and corresponding reasons for call diversions according to an embodiment of the disclosure.

Whenever the application server 108 diverts a call from node B 110b to node C 110c, the application server 108 can transmit a call diversion reason code 120 to node B 110b to indicate the reason for the diversion. The call diversion reason code 120 can also be referred to as the diversion reason element The code 120 might be obtained from an existing set of codes 120 typically included in or available to the application server 108. A set of codes 120 that the application server 108 might use to indicate the diversion reason is described in the Internet Engineering Task Force (IETF) Request for Comments (RFC) 4458 and is shown in FIG. 2. Each code 120 in a table 122 of codes 120 corresponds to a reason 125 that a call diversion occurred. The application server 108 might generate these call diversion reason codes 120 when a call diversion is detected. Alternatively, the application server 108 might be made aware of the codes 120 when the codes 120 are generated by another component in the network 102. In other embodiments, other codes and/or reasons that are available to the application server 108 or a similar component could be used. IETF RFC 4458, as well as, ETSI TS 183 004: "Telecommunications and Internet converged Services and Protocols for Advanced Networking (TISPAN)", ETSI TISPAN#15Bis, 15bTD338_03075-attachment are all incorporated herein by reference for all purposes.

Details of the information that might be included with a call upon the first diversion of the call can be found in ETSI TS 183 004, 15bTD338_03075-attachment section 4.5.2.6.2.2, as follows:

When this is the first diversion the communication has undergone, the following information can be set in the retargeted request: the diverting parties address, the diverted-to party address, and diversion information. The following header fields can be included or modified with the specified values: The Request URI, The History-Info header field, and the To header field. The Request URI can be set to the public user identity where the communication is to be diverted.

In The History-Info header field, two hist-info entries can be generated. The first entry includes the hi-targeted-to-uri of the served user. The privacy header "history" can be escaped within the hi-targeted-to-uri, if the served user wishes privacy (e.g. the served user is subscribed to the OIR Service) or if the served used has the subscription option "Served user allows the presentation of his/her URI to diverted to user" set to false. The Index is set to index=1 according to the rules specified in RFC 4244.

The second entry includes the hi-targeted-to-uri of the address where the communication is diverted to. The index is set to index=1.1. The cause param parameter (redirecting reason and redirecting indicator) included in the history-info header field can be set according to the diversion conditions. The mapping between the diversion conditions and the coding of the cause param parameter can be as follows: Communication forwarding busy, the cause value "486" as defined by RFC 4458 can be used. Communication forwarding no reply, the cause value "408" as defined by RFC 4458 can be used. Communication forwarding unconditional, the cause value "302" as defined by RFC 4458 can be used. Communication deflection (Immediate response), the cause value "480" as defined by RFC 4458 can be used. Communication Forwarding Not Logged in, the cause value "404" as defined by RFC 4458 can be used. Communication deflection during alerting, the cause value "487" as defined by RFC 4458 can be used. Communication Forwarding on Subscriber Not reachable, the cause value "503" as defined by RFC 4458 can be used, according to the rules specified in RFC 4244.

In the To header field, if the served user does not want to reveal its identity to the diverted-to party, then the To header can be changed to the URI where the communication is diverted to. The served user does not want to reveal its identity when one of the following conditions holds true: If the served user wishes privacy (e.g. the served user is subscribed to the OIR Service); or if the served used has the subscription option "Served user allows the presentation of his/her URI to diverted to user" set to false. In all other cases the To header should not be changed.

Details of the information that might be included with a call upon subsequent diversions of the call can be found in ETSI TS 183 004, 15bTD338_03075-attachment, section 4.5.2.6.2.3, as follows:

When this is the second or greater diversion the communication has undergone, a new history-info entry can be added to the History-Info header field according to the rules defined in RFC 4244. The following information can be added to the retargeted request: the diverted-to party address and diversion information. The following header fields can be included or modified with the specified values: Request URI, History-Info header, and To header. The Request URI can be set to the public user identity where the communication is to be diverted.

In the History-info header, the history entry representing the served user may be modified. One history entry is added. The history entry representing the served user privacy header "history" can be escaped within the hi-targeted-to-uri, if the served user wishes privacy (e.g. the served user is subscribed to the OIR Service) or if the served user has the subscription option "Served user allows the presentation of his/her URI to diverted to user" set to false. If the history is already escaped with the correct privacy value, no modification is needed. In all other cases, the history entry representing the served user should not be changed.

A history entry can be added where the hi-targeted-to-uri is set to the public user identity where the communication is diverted to cause param parameter (redirecting reason) included in the History-info header field can be set according to the diversion conditions. The mapping between the diversion conditions and the coding of the cause param parameter can be as follows: Communication forwarding busy, the Cause value "486" as defined by RFC 4458 can be used. Communication forwarding no reply, the Cause value "408" as defined by RFC 4458 can be used. Communication forwarding unconditional, the Cause value "302" as defined by RFC 4458 can be used. Communication deflection (Immediate response), the Cause value "480" as defined by RFC 4458 can be used. Communication Forwarding Not Logged in, the Cause value "404" as defined by RFC 4458 can be used. Communication deflection during alerting, the cause value "487" as defined by RFC 4458 can be used. Communication Forwarding on Subscriber Not reachable, the cause value "503" as defined by RFC 4458 can be used. The Index can be incremented according to the Basic Forwarding rules specified in section 4.3.3.1.3. "Indexing in the History-Info Header" of RFC 4244. The new level index "1" can be used.

In the To header, if the served user does not want to reveal its identity to the diverted-to party, then the To header can be changed to the URI where the communication is diverted to. The served user does not want to reveal its identity when one of the following conditions holds true: if the served user wishes privacy (e.g. the served user is subscribed to the OIR Service); or if the served used has the subscription option "Served user allows the presentation of his/her URI to diverted to user" set to false. In all other cases the To header should not be changed.

When one of the codes 120, or a similar call diversion reason code, is transmitted to one of the nodes 110, the node 110 can convert the code 120 into a call diversion reason indicator 130. The reason indicator 130 might be a text-based call diversion reason message that is displayed on the display screen of the node 110. Alternatively, the reason indicator 130 might be a visible indicator, an audible indicator, a vibration, or some other type of indication perceivable and possibly configurable by the user of the node 110.

In the case where the node 110 converts one of the codes 120 into a text-based diversion reason message, the text of the message might be the same as the text typically associated with that code 120. For example, if the diversion codes of RFC 4458 are used, a diversion code 120 of '486', corresponding to a diversion reason 125 of 'User Busy', might be generated when a call is diverted from one of the nodes 110. The application server 108, or a similar component, might have access to this code 120 and might transmit the '486' code to the node 110 from which the call was diverted.

The node 110 might include or have access to a table 140 that contains information substantially similar to the information in the application server table 122 of FIG. 2. That is, the table 140 might contain a list of diversion reason codes 120 and corresponding diversion reasons 125. Correlating the '486' reason code received from the application server 108 with the '486' code in the table 140 and its corresponding reason 125, the node 110 might retrieve the message 'User Busy' from the table 140 and display that message on the node's display screen, assuming the node 110 is configured to present a text-based diversion reason message in the English language. Alternatively, the reasons 125 in the table 140 might include other text that might be more detailed or more user-friendly. The node 110 might correlate the diversion reason code 120 with this other text and display the other text as the reason indicator 130. If the node 110 receives a code 120 it doesn't recognize or does not receive a code 120, the node 110 can assume the diversion reason code is "404", "Unknown/Not Available".

The node 110 or the application server 108 can also use other information to determine the reason indicator 130. For example, in a rule-based CDIV application in the application server 108, a rule identifier can be transmitted using the CDIVN service or a rule identifier can be used by the CDIVN application to determine a suitable reason indicator 130.

In an embodiment, a language indicator 150 might be stored on one of the nodes 110 and may be configurable by the node user. The node user might set the language indicator 150 on the node 110 to correspond to the language in which the user would like to receive diversion reason notifications. The table 140 might contain reasons 125 in a plurality of languages for each of the codes 120, and the language indicator 150 might specify which of the languages should be used to display a message. When the node 110 receives a code 120, the language indicator 150 might be retrieved from storage, and a diversion reason in the language corresponding to the language specified by the language indicator 150 might then be retrieved from the table 140.

For example, if the '486' code 120 is transmitted to one of the nodes 110 and the language indicator 150 is set to English, the node 110 might retrieve the English message 'User Busy' and present that message as the reason indicator 130. If the '486' code 120 is transmitted and the language indicator 150 is set to indicate another language, a message that corresponds to the '486' code 120 in the other language could be retrieved from the table 140 and presented as the reason indicator 130.

The language indicator 150 and the diversion reason code 120 are not necessarily the only inputs needed to choose a reason indicator or indicator combination. The language indicator 150 may also be referred to herein as locale-independent encoding.

In an embodiment, a node user requesting the CDIVN service can specify whether CDIVN with diversion reason notification, as described herein, is to be used, or whether standard CDIVN without diversion reason notification is to be used. For example, if the user submits a SIP Subscribe message to request the CDIVN service, the user can include in the Subscribe message an indication of whether a diversion reason should be included when a diversion notification is sent to the user's node 110.

The component that, responsive to a communication diversion and other conditions, promotes communicating information related to the communication diversion, is activated if the corresponding subscription option (subscription option "Served user receives notifications (CDIVN) of their communication diversions" in Table 4.3.1.1 of ETSI TS 183 004, 15bTD338_03075-attachment) is set to "true" or to "yes".

In an embodiment, a node user can specify various selection criteria related to call diversion reason notification. For example, the user might specify that diversion reason notifications are to be sent to the users node only when particular diversion reasons occur. Details regarding specifying such criteria can be found in ETSI TS 183 004, 15bTD338_03075-attachment (contained in the archive named 15bTD338_03075.zip, section 4.10.1.1.1.1.1, as follows:

The user would be able to select a specific subset of the overall communication diversions for notification. This helps the user to focus only on those communication diversions which may be important (e.g. "let me know whenever calls from my boss' addresses get diverted"). The user is able to set the following criteria for selecting the communication diversions which have to be notified: Identity of the Originating party, Identity of the Diverting party, Identity of the Diverted-To party, Time-Range of the Communication Diversion, and Reason for the Communication Diversion.

For Identity of the Originating party, the specified URI will be compared with the URI (Identity) of the Originating party in the incoming communication. If there is a match, then information about the diversion of this specific communication is selected for notification to the Diverting user. This is an optional parameter. If absent, then all diversions for communications from any Originating party could be considered for notification, subject to other filter criteria.

For Identity of the Diverting party, the specified URI will be compared with the Request-URI of the Diverting user for which a communication has been diverted. If there is a match, then information about this specific communication diversion is notified to the subscribing user. This is an optional parameter. If absent, then communication diversions towards all registered contacts of the subscribing user could be considered for notification, subject to other filter criteria.

For Identity of the Diverted-To party, the specified URI will be compared with the URI of the Diverted-to party to whom the communication has been diverted. If there is a match, then information about this specific communication diversion is notified to the subscribing user. This is an optional parameter. If absent, then communication diversions towards any Diverted-To party could be considered for notification, subject to other filter criteria.

The Time-Range of the Communication Diversion specifies a time-range within which all communication diversions are notified to the subscribing user. If present, then any communication diversion outside of this time-range would not be notified to the Diverting user. This is an optional parameter. If absent, then Communication Diversions happening at any time would be considered for notification, subject to other filter criteria. A time zone should be indicated. If a time zone is not indicated, the SUBSCRIBE can be rejected with a SIP 489.

For Reason for the Communication Diversion, the Diverting user can select that only those communication diversions which match the herein specified reasons be notified. This is an optional parameter. If absent, then all communication diversions resulting due to any reason would be considered for notification, subject to other filter criteria.

In another embodiment, a node user can specify various trigger criteria related to call diversion notification. For example, the user might specify that diversion reason notifications are to be sent to the user's node only within a particular time range. Details regarding specifying such criteria can be found in ETSI TS 183 004, 15bTD338_03075-attachment (contained in the archive named 15bTD338_03075.zip, section 4.10.1.1.1.2, as follows:

As a part of the SUBSCRIBE message body, the user may specify further criteria to trigger the notification of those communication diversions that were selected by the above-mentioned criteria. These criteria enable the user to trigger the notification based on a Time-Range and/or a Presence-status. The Time-Range specifies a time range at which notifications of communication diversion can be sent to the user. It may be specified in the form of a time-interval to enable periodic triggering of notifications of communication diversions which took place in that time-interval. If absent, it indicates that notifications are sent immediately when the communication diversion takes place. A time zone should be indicated. If a time zone is not indicated, the SUBSCRIBE can be rejected with a SIP 489. The Presence-status specifies a presence state of the user within which the user expects to receive notifications about communication diversions. If absent, it indicates that notifications are sent immediately irrespective of user's availability information.

In addition, the user may overwrite the CDIVN Buffer Timer with the Notification Buffer Interval as part of the SUBSCRIBE message body. The Buffer Interval value is the time up to which the CDIVN AS should buffer the notification if it cannot be delivered to the user at the time of CDIVN AS execution. The user can be notified if CDIVN activation is valid and the CDIVN Buffer Timer to provide the notification has not expired.

A Notification Buffer Interval can specify an optional element (in seconds) to overwrite the CDIVN Buffer Timer for which the CDIVN AS should store the CDIV Notification, if it cannot be delivered to the user, as per the criteria configured above. For example, this might be required for buffering the notifications if the user is logged out and the diversion is triggered due to CFNL/CFNRc, resulting in CDIVN for that diversion. The user may set Notification Buffer Interval value in seconds to a maximum value of one day. Also, if not configured by the user, the default value of one day (as configured by the network provider) may be applicable.

In yet another embodiment, a node user can specify various information selection criteria related to call diversion reason notification. For example, the user might specify that the diversion reason notifications that are sent to the user's node should contain only particular information. Details regarding specifying such criteria can be found in ETSI TS 183 004, 15bTD338_03075-attachment (contained in the archive named 15bTD338_03075.zip, section 4.10.1.1.1.3, as follows:

As a part of the SUBSCRIBE message body, the user may specify further criteria to enable/disable which information about the communication diversion should be notified. By default, all information about a communication diversion would be notified. However, the user may use the following elements for disabling a particular kind of information from being notified: URI of the Originating party, URI of the Diverting party, URI of the Diverted-To party, Time of the Communication Diversion, Reason for the Communication Diversion, and Identity of the rule which triggered the Communication Diversion.

In another embodiment a node user will receive various related to call diversion reason notification. Details regarding specifying such criteria can be found in ETSI TS 183 004, 15bTD338_03075-attachment, section 4.10.1.1.2, as follows:

The body of a notification of communication diversion could contain information about the communication diversion, as selected by the various filter criteria configured by the user in the SUBSCRIBE message body. If the SUBSCRIBE did not contain a message body, then all possible information about the communication diversion is notified to the User. The notifications generated by the server can be in one of the formats specified in the Accept header field in the SUBSCRIBE request. The XML event package is sent as the body of the NOTIFY method and could contain the following information (subject to the filter criteria) selected by the user: Identity of the Originating party, Information of the Diverting party, Information about the Diverted-To party, Time of the Communication Diversion, Reason for the Communication Diversion, and Communication Diversion Rule.

Identity of the Originating party helps the Diverting user in knowing whose communication was diverted. For Information of the Diverting party, the Request-URI of the INVITE before the Communication Diversion Service was executed is informed to the subscribing user. For Information about the Diverted-To party, the Public User Identity of the Diverted-to User to whom the communication is being diverted is informed to the subscribing user. The Time of the Communication Diversion is informed to the subscribing user. A time zone should be indicated. The Reason for the Communication Diversion is the same as the Reason Parameter as provisioned according to clause 4.10.1.1.1.1. It enables the subscriber to filter on diversion notifications for a particular cause. The Communication Diversion Rule identifies the Communication Diversion Rule as mentioned in clause 4.9.1.2 which was executed to result in the communication diversion, which is being notified to the user. It contains the "id" attribute of Communication Diversion Rule.

In an embodiment, the call diversion reason notification functionality can be implemented in the Extensible Markup Language (XML). An example of XML code that could be used for this purpose can be found in ETSI TS 183 004, 15bTD338_03075-attachment, section 4.10.2, as follows:

```
<?xml version="1.0" encoding="UTF-8" ?>
<xs:schema
  targetNamespace="http://uri.etsi.org/ngn/params/xml/comm-div-info"
  xmlns:tns="http://uri.etsi.org/ngn/params/xml/comm-div-info"
  xmlns:xs="http://www.w3.org/2001/XMLSchema"
  xmlns="http://uri.etsi.org/ngn/params/xml/comm-div-info"
  elementFormDefault="qualified"
  attributeFormDefault="unqualified">
<!--
  This import brings in the XML language definition
-->
<xs:import namespace="http://www.w3.org/XML/1998/namespace"
  schemaLocation="http://www.w3.org/2001/03/xml.xsd"/>
<!--
  Communication Diversion Information. This is the top-level XML
element
-->
<xs:element name="comm-div-info"
  type="comm-div-info-type" />
<!--
  Communication Diversion Information Type. This is the top-level
XML element
-->
<xs:complexType name="comm-div-info-type">
  <xs:sequence>
    <xs:element name="comm-div-subs-info"
      type="comm-div-subs-info-type" minOccurs="0" />
    <xs:element name="comm-div-ntfy-info"
      type="comm-div-ntfy-info-type" minOccurs="0" />
    <xs:any namespace="##other" processContents="lax"
      minOccurs="0" maxOccurs="unbounded"/>
  </xs:sequence>
  <xs:attribute name="entity" type="xs:anyURI"
    use="required"/>
</xs:complexType>
<!---
  Communication Diversion Subscription Type.
  Used at Subscription time to
  select Communication Diversions for notification,
  when to notify them end
  what to notify.
-->
<xs:complexType name="comm-div-subs-info-type">
  <xs:sequence>
    <xs:element name="comm-div-selection-criteria"
      type="comm-div-selection-criteria-type"
      minOccurs="0" />
    <xs:element name="comm-div-ntfy-trigger-criteria"
      type="comm-div-ntfy-trigger-criteria-type"
      minOccurs="0" />
    <xs:element name="comm-div-info-selection-criteria"
      type="comm-div-info-selection-criteria-type"
      minOccurs="0" />
```

```
        <xs:any namespace="##other" processContents="lax"
            minOccurs="0" maxOccurs="unbounded"/>
      </xs:sequence>
      <xs:anyAttribute namespace="##other" processContents="lax"/>
    </xs:complexType>
    <!--
      Communication Diversion Notification Information Type
      Used while notifying the User about the Communication Diversion
    -->
    <xs:complexType name="comm-div-ntfy-info-type">
      <xs:sequence>
        <xs:element name="originating-user-info"
            type="xs:anyURI" minOccurs="0" />
        <xs:element name="diverting-user-info"
            type="xs:anyURI" minOccurs="0" />
        <xs:element name="diverted-to-user-info"
            type="xs:anyURI" minOccurs="0" />
        <xs:element name="diversion-time-info"
            type="xs:dateTime" minOccurs="0" />
        <xs:element name="diversion-reason-info"
            type="diversion-reason-info-types" minOccurs="0" />
        <xs:element name="diversion-rule-info"
            type="diversion-rule-info-type" minOccurs="0" />
        <xs:any namespace="##other" processContents="lax"
            minOccurs="0" maxOccurs="unbounded"/>
      </xs:sequence>
      <xs:anyAttribute namespace="##other" processContents="lax"/>
    </xs:complexType>
    <!--
      COMMUNICATION DIVERSION SELECTION CRITERIA
    -->
    <xs:complexType name="comm-div-selection-criteria-type">
      <xs:sequence>
        <xs:element name="originating-user-selection-criteria"
            type="xs:anyURI"
            minOccurs="0" />
        <xs:element name="diverting-user-selection-criteria"
            type="xs:anyURI"
            minOccurs="0" />
        <xs:element name="diverted-to-user-selection-criteria"
            type="xs:anyURI"
            minOccurs="0" />
        <xs:element name="diversion-time-selection-criteria"
            type="time-range-selection-criteria-type"
            minOccurs="0" />
        <xs:element name="diversion-reason-selection-criteria"
            type="diversion-reason-selection-criteria-type"
            minOccurs="0" />
        <xs:any namespace="##other" processContents="lax"
            minOccurs="0" maxOccurs="unbounded"/>
      </xs:sequence>
      <xs:anyAttribute namespace="##other" processContents="lax"/>
    </xs:complexType>
    <!--
      COMMUNICATION DIVERSION NOTIFICATION TRIGGER CRITERIA
    -->
    <xs:complexType name="comm-div-ntfy-trigger-criteria-type">
      <xs:sequence>
        <xs:element name="notification-time-selection-criteria"
            type="time-range-selection-criteria-type"
            minOccurs="0" />
        <xs:element name="presence-status-selection-criteria"
            type="presence-status-selection-criteria-type"
            minOccurs="0" />
        <xs:element name="notification-buffer-interval" minOccurs="0" default="86400">
          <xs:simpleType>
            <xs:restriction base="xs:integer">
              <xs:maxInclucive value="86400"/>
            </xs:restriction>
          </xs:simpleType>
        </xs:element>
        <xs:any namespace="##other" processContents="lax"
            minOccurs="0" maxOccurs="unbounded"/>
      </xs:sequence>
      <xs:anyAttribute namespace="##other" processContents="lax"/>
    </xs:complexType>
    <!--
      COMMUNICATION DIVERSION INFORMATION SELECTION CRITERIA
    -->
    <xs:complexType name="comm-div-info-selection-criteria-type">
      <xs:sequence>
        <xs:element name="disable-originating-user-info"
            type="xs:boolean" default="false" minOccurs="0" />
        <xs:element name="disable-diverting-user-info"
            type="xs:boolean" default="false" minOccurs="0" />
        <xs:element name="disable-diverted-to-user-info"
            type="xs:boolean" default="false" minOccurs="0" />
        <xs:element name="disable-diversion-time-info"
            type="xs:boolean" default="false" minOccurs="0" />
        <xs:element name="disable-diversion-reason-info"
            type="xs:boolean" default="false" minOccurs="0" />
        <xs:element name="disable-diversion-rule-info"
            type="xs:boolean" default="false" minOccurs="0" />
        <xs:any namespace="##other" processContents="lax"
            minOccurs="0" maxOccurs="unbounded"/>
      </xs:sequence>
      <xs:anyAttribute namespace="##other" processContents="lax"/>
    </xs:complexType>
    <!--
      DIVERSION REASON INFO
    -->
    <xs:simpleType name="diversion-reason-info-types">
      <xs:list itemType="diversion-reason-info-type"/>
    </xs:simpleType>
    <xs:simpleType name="diversion-reason-info-type">
      <xs:restriction base="xs:integer">
        <xs:enumeration value="404"/>
        <xs:enumeration value="486"/>
        <xs:enumeration value="408"/>
        <xs:enumeration value="302"/>
        <xs:enumeration value="487"/>
        <xs:enumeration value="480"/>
        <xs:enumeration value="503"/>
      </xs:restriction>
    </xs:simpleType>
    <!--
      DIVERSION RULE INFO
    -->
    <xs:complexType name="diversion-rule-info-type">
      <xs:sequence>
        <xs:element name="diversion-rule" type="xs:string"/>
      </xs:sequence>
      <xs:anyAttribute namespace="##other" processContents="lax"/>
    </xs:complexType>
    <!--
      DIVERSION REASON SELECTION CRITERIA
    -->
    <xs:complexType name="diversion-reason-selection-criteria-type">
      <xs:sequence>
        <xs:element name="diversion-reason-info"
            type="diversion-reason-info-types"/>
      </xs:sequence>
      <xs:anyAttribute namespace="##other" processContents="lax"/>
    </xs:complexType>
    <!--
      TIME RANGE SELECTION CRITERIA
    -->
    <xs:complexType name="time-range-selection-criteria-type">
      <xs:sequence>
        <xs:element name="time-range"
            type="time-range-type" minOccurs="0"
            maxOccurs="unbounded" />
      </xs:sequence>
      <xs:anyAttribute namespace="##other" processContents="lax"/>
    </xs:complexType>
    <!--
      TIME RANGE INFO
    -->
    <xs:complexType name="time-range-type">
      <xs:sequence>
        <xs:element name="start-time" type="xs:dateTime" />
        <xs:element name="end-time" type="xs:dateTime" />
      </xs:sequence>
      <xs:anyAttribute namespace="##other" processContents="lax"/>
    </xs:complexType>
    <!--
```

-continued

```
    PRESENCE STATUS SELECTION CRITERIA
-->
<xs:complexType name="presence-status-selection-criteria-type">
    <xs:sequence>
        <xs:element name="presence-status-info"
            type="presence-status-info-type" minOccurs="0"
            maxOccurs="unbounded" />
    </xs:sequence>
    <xs:anyAttribute namespace="##other" processContents="lax"/>
</xs:complexType>
<!--
    PRESENCE STATUS INFo
-->
<xs:complexType name="presence-status-info-type">
    <xs:sequence>
        <xs:element name="presence-status" type="xs:string" />
    </xs:sequence>
    <xs:anyAttribute namespace="##other" processContents="lax"/>
</xs:complexType>
</xs:schema>
```

Figure 3:
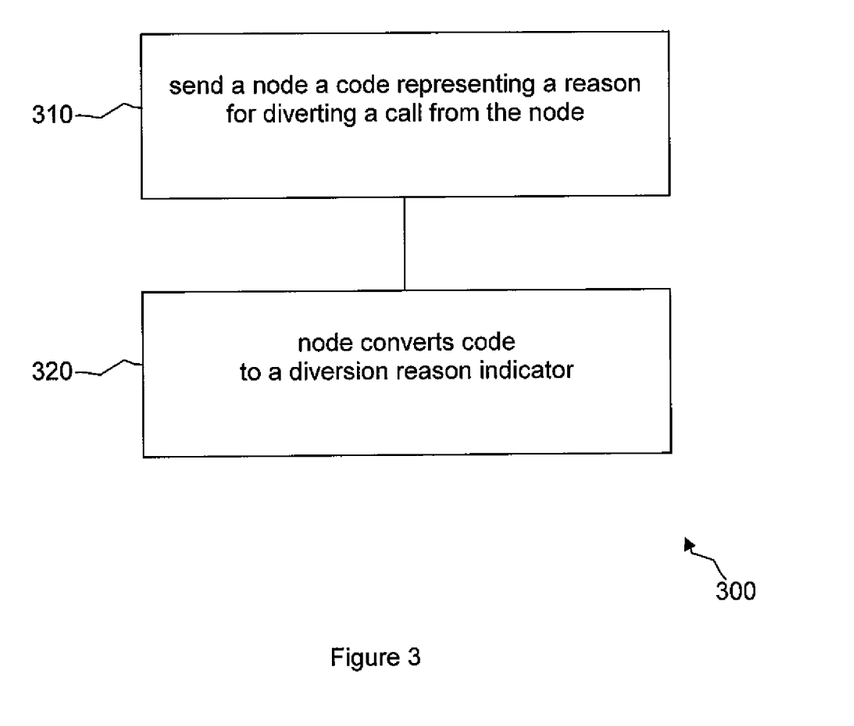
FIG. 3 is a block diagram of a method for notifying a node of a reason for a diversion of a call from the node according to an embodiment of the disclosure.

FIG. 3 is a block diagram of a method 300 for notifying a node of a reason for a diversion of a call from the node. At block 310, a code is sent to the node representing the reason for the diversion. At block 320, the node converts the code to a diversion reason indicator.

The diversion reason notifications may include a capability for a user to specify a time range when diversions are to be notified. That is, when a call diversion occurs within a specified time range, a diversion reason notification is prepared for sending to the node 110 at approximately the time the diversion occurs. If a call diversion occurs outside the specified time range, no diversion reason notification might be prepared.

In addition, the diversion reason notifications may include a capability for a user to specify a time range when notifications are to be transmitted. That is, when a notification is prepared within a specified time range, a diversion reason notification is sent to the node 110 at approximately the time the diversion occurs. If a notification is prepared outside the specified time range, a diversion reason notification might be sent to the node 110 the next time the specified time range occurs. Alternatively, no notification is prepared outside the specified time range.

For example, a user of the node 110 might specify that the diversion reason notifications are to be transmitted to the node 110 only between 9:00 AM and 5:00 PM. If a call diversion occurs at 9:05 AM, which is within the time range, a diversion reason notification might be sent to the node 110 shortly after 9:05 AM of that day. If a call diversion occurs at 5:05 PM, which is outside the time range, a diversion reason notification might be sent to the node 110 at approximately 9:00 AM the next day, which is the next occasion when the time range occurs. Alternatively, a diversion reason notification might not be sent at all for such a call diversion. The term "time element" may be used herein to indicate one or both of the time and/or date.

The present disclosure, according to one embodiment, provides for specifying a time zone for this time range. If the node 110 is in a different time zone from the application server 108 or other network component that provides the notifications, it is not clear whether the notifications would be transmitted based on the current time of the application server 108 or on the current time of the node 110. Thus, the notifications could be sent in a time range different from the time range preferred by the user.

For example, a user who wishes to receive the notifications between 9:00 AM and 5:00 PM in his or her current local time might travel to a time zone two hours ahead of his or her usual time zone. If no provision is made to adjust the users current time zone, the notifications might be sent between 9:00 AM and 5:00 PM in the user's usual time zone, but the user would receive the notifications between 11:00 AM and 7:00 PM in his or her current local time. This would be outside the time range when the user prefers to receive the notifications.

In an embodiment, a time zone indicator 160 can be set to specify the time zone that applies to the time range in which the diversion reason notifications are to occur. A user in a time zone different from his or her usual time zone might specify that the time for the notifications should be based on the time zone in which he or she is currently located. Alternatively, such a user might wish to continue to receive notifications at times based on his or her usual time zone.

The time zone indicator 160 might be submitted in a SIP 'Subscribe' message that the user sends to the application server 108 upon requesting the call diversion service. In an embodiment, if the user fails to specify a time zone, the application server 108 can send an error message 170 to the user's node 110 informing the user that no time zone was designated for the notification time range. The error message 170 might be a SIP 489 "Bad Event" message. If the user does specify a time zone or a time zone offset, the application server 108 sends the diversion reason notifications in the time range in the specified time zone or with the specified time zone offset.

Continuing the example above, the user who is in a time zone two hours ahead of his or her usual time zone may wish to receive the notifications between 9:00 AM and 5:00 PM in his or her current time zone. The user might inform the application server 108 of this desire by setting the time zone indicator 160 appropriately and sending the time zone indicator 160 to the application server 108. The application server 108 could then make the appropriate adjustments to the notification transmission times to cause the notifications to be transmitted between 9:00 AM and 5:00 PM in the user's current time zone.

In an alternative embodiment, if the application server 108 receives a SIP Subscribe that includes a time element but lacks a time zone or time zone offset indicator, the application server 108 can assume that all times are in Coordinated Universal Time (UTC) or can assume that all times are in a configured time zone.

Figure 4:
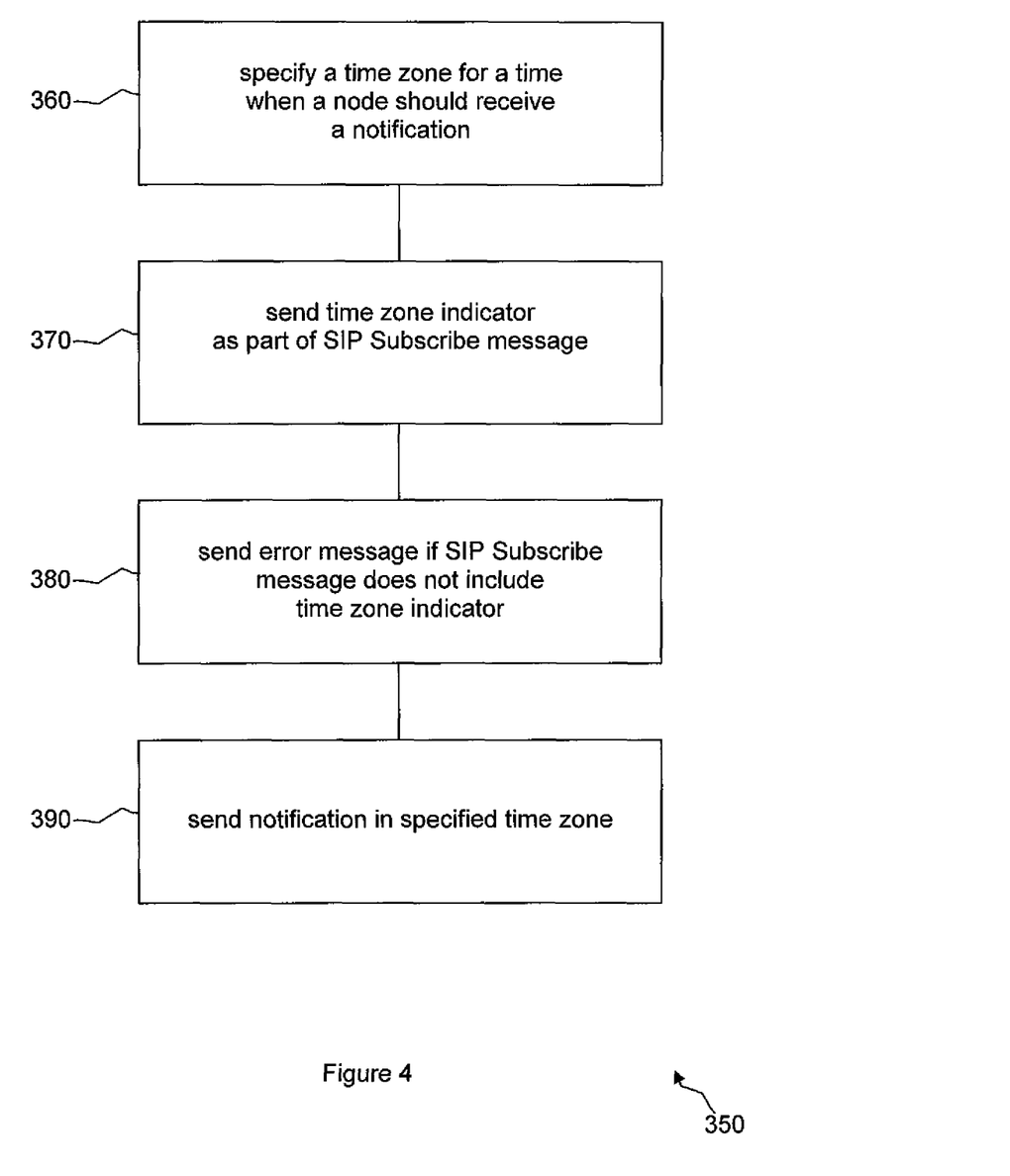
FIG. 4 is a block diagram of a method for notifying a node regarding a communication diversion according to an embodiment of the disclosure.

FIG. 4 is a block diagram of a method 350 for notifying a node. At block 360, a time zone is specified for a time when the node should receive a notification. At block 370, a time zone indicator is sent as part of a SIP 'Subscribe' message. The time zone indicator would typically be sent from a node to an application server. At block 380, an error message, such as a SIP 489 "Bad Event", is sent if the SIP 'Subscribe' message does not include a time zone indicator. The error message would typically be sent to the node by the application server. At block 390, a notification is sent according to the time zone specified by the time zone indicator.

In addition, if the notification sent at block 390 includes a Time of the Communication Diversion element, representing the time of the Communication Diversion, the Time of the Communication Diversion element shall indicate a time zone.

Figure 5:
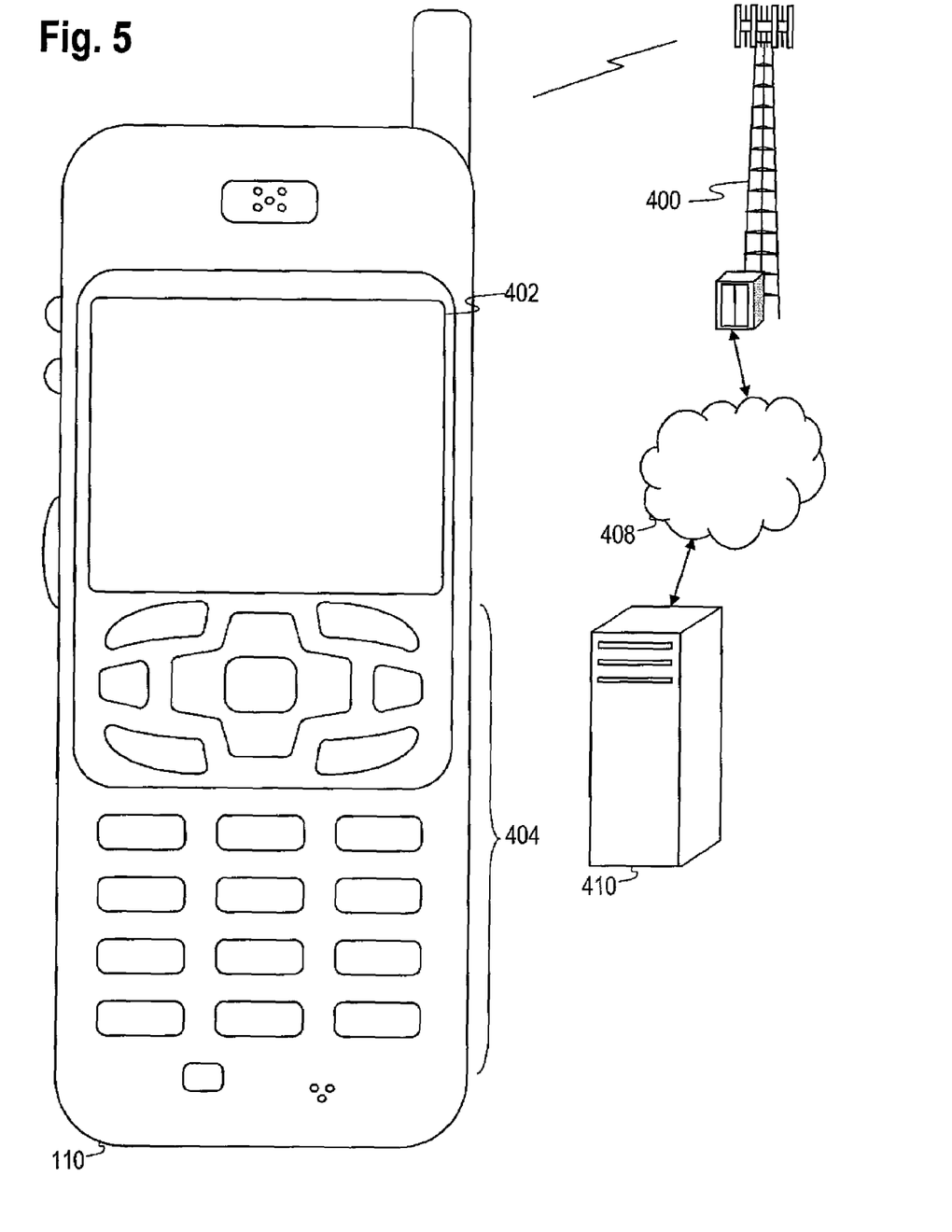
FIG. 5 is a diagram of a wireless communications system including a node operable for some of the various embodiments of the disclosure.

FIG. 5 illustrates a wireless communications system including an embodiment of one of the nodes 110 of FIG. 1. The node 110 is operable for implementing aspects of the disclosure, but the disclosure should not be limited to these implementations. Though illustrated as a mobile phone, the node 110 may take various forms including a wireless handset, a pager, a personal digital assistant (PDA), a portable computer, a tablet computer, or a laptop computer. Many suitable devices combine some or all of these functions. In some embodiments of the disclosure, the node 110 is not a general purpose computing device like a portable, laptop or tablet computer, but rather is a special-purpose communications device such as a mobile phone, wireless handset, pager, or PDA. In another embodiment, the node 110 may be a portable, laptop or other computing device. The node 110 may support specialized activities such as gaming, inventory control, job control, and/or task management functions, and so on.

The node 110 includes a display 402. The node 110 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The node 110 may present options for the user to select, controls for the user to actuate, and/or cursors or other indicators for the user to direct. The node 110 may further accept data entry from the user, including numbers to dial or various parameter values for configuring the operation of the node 110. The node 110 may further execute one or more software or firmware applications in response to user commands. These applications may configure the node 110 to perform various customized functions in response to user interaction. Additionally, the node 110 may be programmed and/or configured over-the-air, for example from a wireless base station, a wireless access point, or a peer node 110.

Among the various applications executable by the node 110 are a web browser, which enables the display 402 to show a web page. The web page may be obtained via wireless communications with a wireless network access node, a cell tower, a peer node 110, or any other wireless communication network or system 400. The network 400 is coupled to a wired network 408, such as the Internet. Via the wireless link and the wired network, the node 110 has access to information on various servers, such as a server 410. The server 410 may provide content that may be shown on the display 402. Alternately, the node 110 may access the network 400 through a peer node 110 acting as an intermediary, in a relay type or hop type of connection.

Figure 6:
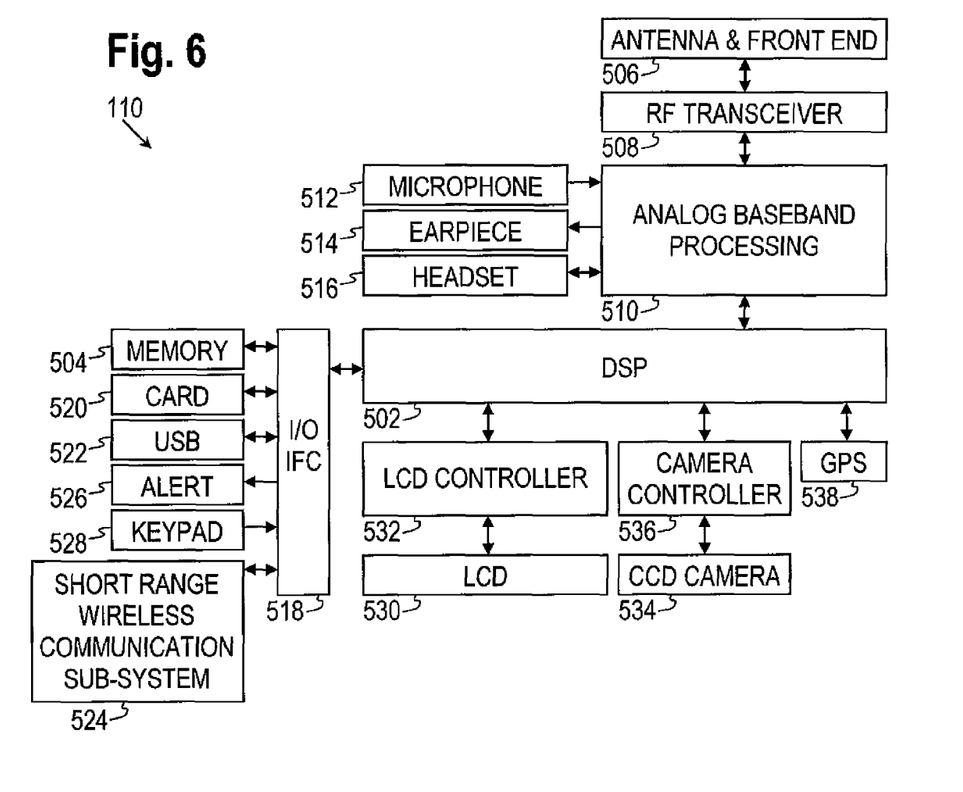
FIG. 6 is a block diagram of a node operable for some of the various embodiments of the disclosure.

FIG. 6 shows a block diagram of one of the nodes 110. While a variety of known components of nodes 110 are depicted, in an embodiment a subset of the listed components and/or additional components not listed may be included in the node 110. The node 110 includes a digital signal processor (DSP) 502 and a memory 504. As shown, the node 110 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the node 110 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the node 110 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the node 110 to send and receive information from a cellular network or some other available wireless communications network or from a peer node 110. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the node 110 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the node 110 and may also enable the node 110 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the node 110 to communicate wirelessly with other nearby mobile devices and/or wireless base stations.

The input/output interface 518 may further connect the DSP 502 to the alert 526 that, when triggered, causes the node 110 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the node 110. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the node 110 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the node 110 to determine its position. Various other peripherals may also be included to provide additional functions, e.g., radio and television reception.

Figure 7:
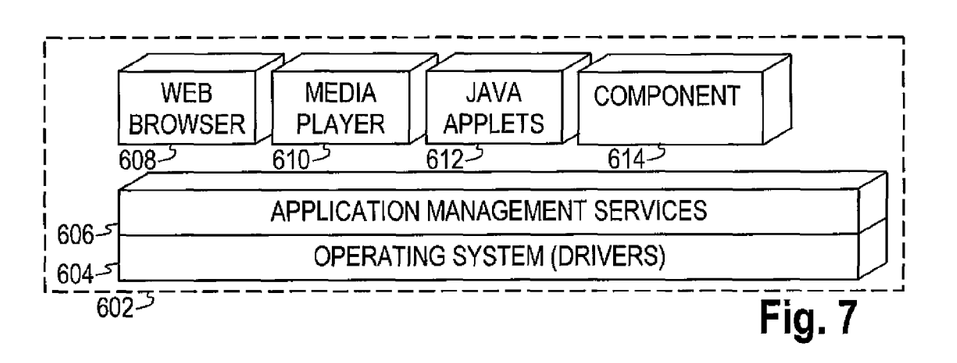
FIG. 7 is a diagram of a software environment that may be implemented on a node operable for some of the various embodiments of the disclosure.

FIG. 7 illustrates a software environment 602 that may be implemented by the DSP 502. The DSP 502 executes operating system drivers 604 that provide a platform from which the rest of the software operates. The operating system drivers 604 provide drivers for the node hardware with standardized interfaces that are accessible to application software. The operating system drivers 604 include application management services ("AMS") 606 that transfer control between applications running on the node 110. Also shown in FIG. 7 are a web browser application 608, a media player application 610, and Java applets 612. The web browser application 608 configures the node 110 to operate as a web browser, allowing a user to enter information into forms and select links to retrieve and view web pages. The media player application 610 configures the node 110 to retrieve and play audio or audiovisual media. The Java applets 612 configure the node 110 to provide games, utilities, and other functionality. A component 614 might provide functionality related to notification of a reason for a call diversion.

Figure 8:
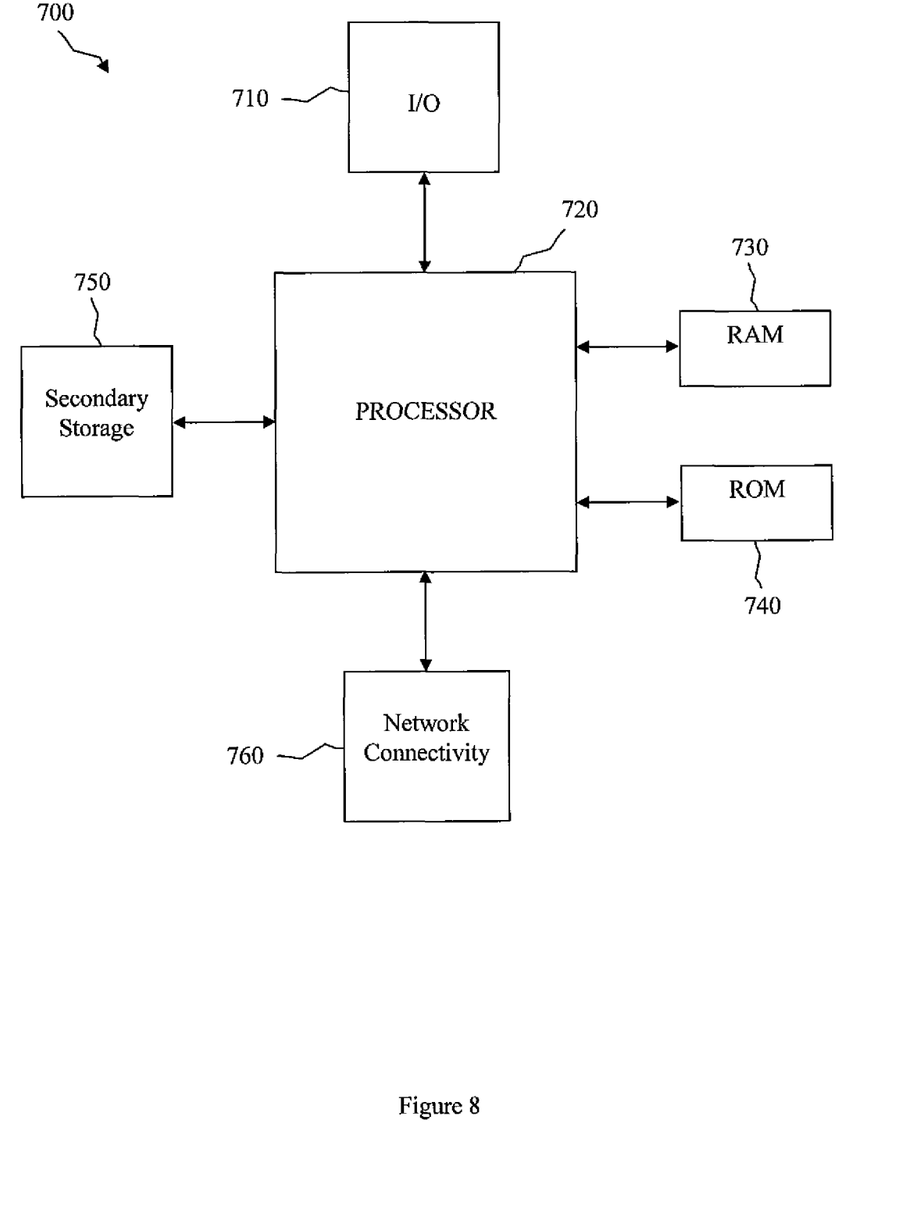
FIG. 8 illustrates an exemplary general-purpose computer system suitable for implementing the several embodiments of the present disclosure.

The nodes 110 of FIG. 1 may include any general-purpose computer with sufficient processing power, memory resources, and network throughput capability to handle the necessary workload placed upon it. FIG. 8 illustrates a typical, general-purpose computer system 700 that may be suitable for implementing one or more embodiments disclosed herein. The computer system 700 includes a processor 720 (which may be referred to as a central processor unit or CPU) that is in communication with memory devices including secondary storage 750, read only memory (ROM) 740, random access memory (RAM) 730, input/output (I/O) devices 710, and network connectivity devices 760. The processor may be implemented as one or more CPU chips.

The secondary storage 750 is typically comprised of one or more disk drives or tape drives and is used for non-volatile storage of data and as an over-flow data storage device if RAM 730 is not large enough to hold all working data. Secondary storage 750 may be used to store programs which are loaded into RAM 730 when such programs are selected for execution. The ROM 740 is used to store instructions and perhaps data which are read during program execution. ROM 740 is a non-volatile memory device which typically has a small memory capacity relative to the larger memory capacity of secondary storage. The RAM 730 is used to store volatile data and perhaps to store instructions. Access to both ROM 740 and RAM 730 is typically faster than to secondary storage 750.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 760 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 760 devices may enable the processor 720 to communicate with an Internet or one or more intranets. With such a network connection, it is contemplated that the processor 720 might receive information from the network, or might output information to the network in the course of performing the above-described method steps. Such information, which is often represented as a sequence of instructions to be executed using processor 720, may be received from and outputted to the network, for example, in the form of a computer data signal embodied in a carrier wave.

Such information, which may include data or instructions to be executed using processor 720 for example, may be received from and outputted to the network, for example, in the form of a computer data baseband signal or signal embodied in a carrier wave. The baseband signal or signal embodied in the carrier wave generated by the network connectivity 760 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 720 executes instructions, codes, computer programs, scripts which it accesses from hard disk, floppy disk, optical disk (these various disk-based systems may all be considered secondary storage 750), ROM 740, RAM 730, or the network connectivity devices 760. While only one processor 720 is shown, multiple processors may be present. Thus, while instructions may be discussed as executed by a processor, the instructions may be executed simultaneously, serially, or otherwise executed by one or multiple processors. One or more systems or components of the UE or node 110 may be referred to herein as accomplishing various tasks or processes in accordance with the disclosed embodiments, and the term component may be used to refer to the processor 720, transceiver, or other well known components for carrying out these tasks.

The following are incorporated herein by reference for all purposes 3GPP TS 24.604 and TISPAN 183.004. Accordingly while some of the disclosed embodiments discuss wireless devices, the present disclosure should not be limited to wireless devices and may also apply equally to any device capable of receiving SIP communications.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A node comprising:
a transceiver configured to send, to an application server, a subscription message requesting notification when a communication for the node is diverted to another node, the subscription message containing a message body with criteria for the notification,
wherein the transceiver is further configured to receive, according to the subscription message, a notification message about a communication diversion, the notification message containing an Extensible Markup Language (XML) document with information related to the criteria, the information including a diversion reason element and a reason code associated with the diversion reason element, and
wherein the criteria of the subscription message specifies at least one of: an identity of an originating party of the communication; a time range for diversion notification; and a reason for diversion.

2. The node of claim 1, wherein the reason code is a numeric value.

3. The node of claim 1, wherein the subscription message is a SIP SUBSCRIBE request.

4. The node of claim 1, wherein the criteria includes a time zone indicator.

5. The node of claim 1, wherein the node is a user agent.

6. The node of claim 1, wherein the reason code corresponds to a code specified in Internet Engineering Task Force (IETF) Request for Comments (RFC) 4458.

7. The node of claim 1, wherein the notification message is a SIP (Session Initiated Protocol) NOTIFY request.

8. The node of claim 1, wherein the criteria requests notification of some but not all communication diversions.

9. The node of claim 1, wherein the XML document is an XML event package.

10. An application server comprising:
a transceiver configured to receive a subscription request from a node, the subscription request including a filter criteria for at least one specific reason to be notified; and
a processor configured to match a redirection reason of a communication diversion to the filter criteria,
wherein the transceiver is further configured to send a diversion notification message to the node, the diversion notification message containing an Extensible Markup Language (XML) document with a diversion reason element and a reason code associated with the diversion reason element, and
wherein the filter criteria of the subscription request specifies at least one of: an identity of an originating party of the communication; a time range for diversion notification; and a reason for diversion.

11. The application server of claim 10, wherein the criteria is specifiable by a user to specify a time range for diversion notification.

12. The application server of claim 11, wherein the subscription request comprises a time zone indicator, and wherein the application server is configured to send diversion notifications based on the time zone indicator and a current time zone of the node.

13. The application server of claim 10, wherein the processor is further configured to map a cause param parameter to the diversion reason element.

14. The application server of claim 13, wherein the reason code corresponds to a numeric code specified in Internet Engineering Task Force (IETF) Request for Comments (RFC) 4458.

15. The application server of claim 14, wherein the mapping of the cause param parameter and the diversion reason element is one of:
Communication forwarding busy, the Cause value "486" as defined by RFC 4458 shall be used;
Communication forwarding no reply, the Cause value "408" as defined by RFC 4458 shall be used;
Communication forwarding unconditional, the Cause value "302" as defined by RFC 4458 shall be used;
Communication deflection (Immediate response), the Cause value "480" as defined by RFC 4458 shall be used;
Communication Forwarding Not Logged in, The Cause value "404" as defined by RFC 4458 shall be used;
Communication deflection during alerting, the cause value "487" as defined by RFC 4458 shall be used; or
Communication Forwarding on Subscriber Not reachable, the cause value "503" as defined by RFC 4458 shall be used.

16. The application server of claim 10, wherein the communication diversion is a first communication diversion or a subsequent communication diversion.

17. The application server of claim 10, wherein the diversion notification message is a SIP (Session Initiated Protocol) NOTIFY request with a body containing the XML document.

18. The application server of claim 10, wherein the criteria requests notification of some but not all communication diversions.

19. The application server of claim 10, wherein the XML document is an XML event package.

20. A non-transitory computer-readable medium storing instructions which are configured to cause an application server to perform operations comprising:
receiving a subscription request from a node, the subscription request including a filter criteria for at least one specific reason to be notified; and
matching a redirection reason of a communication diversion to the filter criteria,
wherein the transceiver is further configured to send a diversion notification message to the node, the diversion notification message containing an Extensible Markup Language (XML) document with a diversion reason element and a reason code associated with the diversion reason element, and
wherein the filter criteria of the subscription request specifies at least one of: an identity of an originating party of the communication; a time range for diversion notification; and a reason for diversion.

21. The non-transitory computer-readable medium of claim 20, wherein the criteria is specifiable by a user to specify a time range for diversion notification.

22. The non-transitory computer-readable medium of claim 20, wherein the instructions are further configured to cause the application server to perform an operation of mapping a cause param parameter to the diversion reason element.

23. The non-transitory computer-readable medium of claim 22, wherein the reason code corresponds to a numeric code specified in Internet Engineering Task Force (IETF) Request for Comments (RFC) 4458.

24. The non-transitory computer-readable medium of claim 23, wherein the mapping of the cause param parameter and the diversion reason element is one of:
Communication forwarding busy, the Cause value "486" as defined by RFC 4458 shall be used;
Communication forwarding no reply, the Cause value "408" as defined by RFC 4458 shall be used;
Communication forwarding unconditional, the Cause value "302" as defined by RFC 4458 shall be used;
Communication deflection (Immediate response), the Cause value "480" as defined by RFC 4458 shall be used;
Communication Forwarding Not Logged in, The Cause value "404" as defined by RFC 4458 shall be used;
Communication deflection during alerting, the cause value "487" as defined by RFC 4458 shall be used; or Communication Forwarding on Subscriber Not reachable, the cause value "503" as defined by RFC 4458 shall be used.

25. The non-transitory computer-readable medium of claim 20, wherein the communication diversion is a first communication diversion or a subsequent communication diversion.

26. The non-transitory computer-readable medium of claim 20, wherein the diversion notification message is a SIP (Session Initiated Protocol) NOTIFY request with a body containing the XML document.

27. The non-transitory computer-readable medium of claim 21, wherein the subscription request comprises a time zone indicator, and wherein the application server is configured to send diversion notifications based on the time zone indicator and a current time zone of the node.

28. The non-transitory computer-readable medium of claim 20, wherein the criteria requests notification of some but not all communication diversions.

29. The non-transitory computer-readable medium of claim 20, wherein the XML document is an XML event package.

\* \* \* \* \*